April 25, 1961
G. B. ACHORN, JR., ET AL
2,981,660
APPARATUS FOR THE CULTIVATION OF
FASTIDIOUS MICROORGANISMS
Filed March 14, 1958
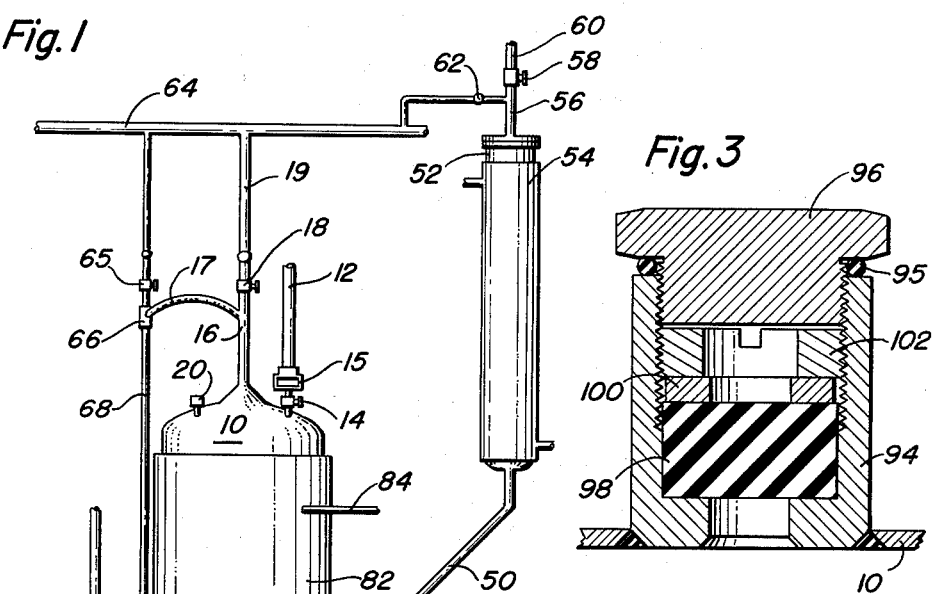
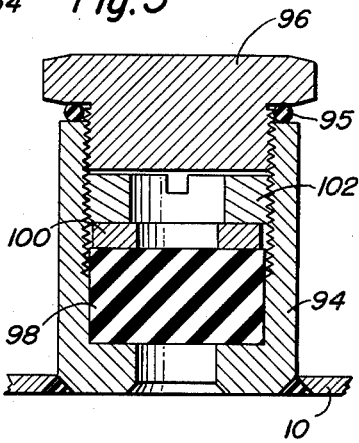
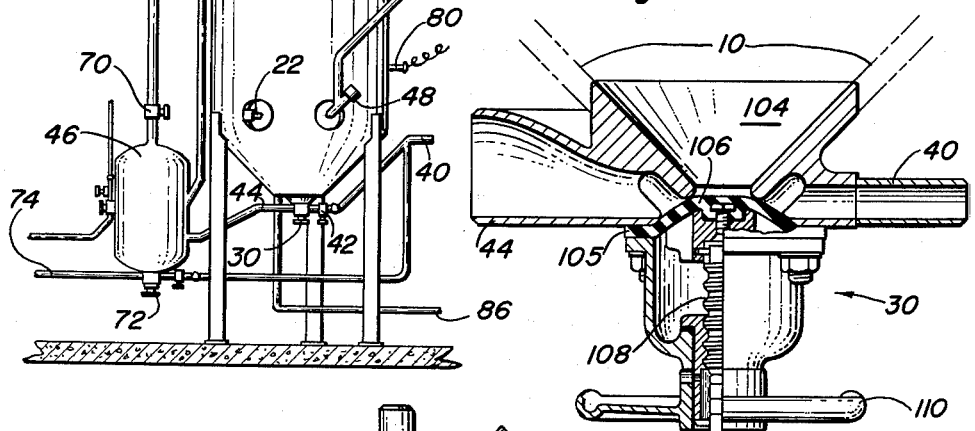
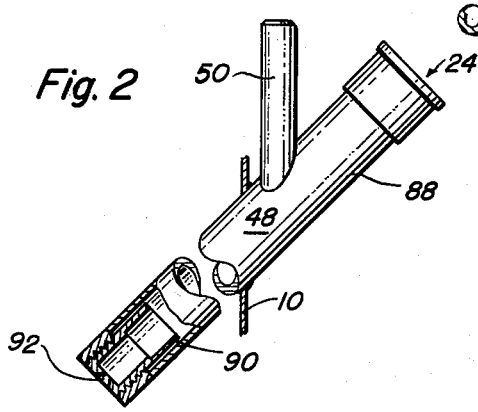
INVENTORS
Glenwood B. Achorn Jr.
Elmer R. Bokesch
Edward R. Dapper
Robert W. Lebherz
Samuel N. Metcalfe
Arthur Rawson
John L. Schwab
James R. E. Smith
BY George Renihan
ATTORNEY

United States Patent Office 2,981,660
Patented Apr. 25, 1961

2,981,660

APPARATUS FOR THE CULTIVATION OF FASTIDIOUS MICROORGANISMS

Glenwood B. Achorn, Jr., P.O. Box 3204, Arsenal, Ark.; Elmer R. Bokesch, 1203 Motter Ave., Edward R. Dapper, 1207 Pinewood Drive, Robert W. Lebherz, Rte. 5, John L. Schwab, R.R. 5, James R. E. Smith, Fort Detrick, all of Frederick, Md.; Arthur Rawson, Rocky Springs, Frederick County, Md.; and Samuel N. Metcalfe, New Windsor, Md.

Filed Mar. 14, 1958, Ser. No. 721,619

8 Claims. (Cl. 195—142)

(Granted under Title 35, U.S. Code (1952), sec. 266)

The invention described herein may be manufactured and used by or for the Government of the United States of America for governmental purposes without the payment to us of any royalty thereon.

This invention relates to the cultivation of microorganisms. It relates more particularly to the apparatus and method for the safe and efficient production of pure cultures of pathogenic fastidious microorganisms by the formentation process in submerged cultures. Further, it relates to a novel drain valve, a novel aeration device and a unique process of aeration and agitation.

Past experience in the design of equipment for producing pure cultures of fastidious organisms has demonstrated the need for marked departures from the techniques commonly employed by the fermentation industry. Designs similar to those used for production of alcohol and antibiotics were tested and found to be unsuitable. Over 50 percent of the cultures of fastidious microorganisms prepared in this type of equipment became contaminated to a point where the data obtained could not be considered reliable.

The results of investigation into the causes for contamination indicated that the systems could not always be sterilized with either liquid decontaminants or steam at a pressure of 40 pounds per square inch gauge. The primary sources of contamination, after attempted sterilization, were valves, pipe ends, pockets or crevices, packing glands, and flanges. Also, the isolation of the fermentor unit was found necessary in order to prevent cross-contamination between units. Therefore, it is recognized that there is a need for unique equipment that will provide the isolated system in which fastidious, pathogenic microorganisms can be developed by particular fermentation processes.

Furthermore, there is also a requirement of efficient growth conditions for the microorganisms. Among these conditions, efficient aeration has been known to be a large factor in microorganism growth, but present methods and apparatus have left something to be desired in the achievement of desirable aeration efficiencies, while maintaining an isolated system.

Hence, the primary objects of this invention are two in number. The first primary object is to provide apparatus and means for safely producing pure cultures of fastidious microorganisms without danger of the contamination of the environment or of the organism.

The second primary object is to provide a novel apparatus and method for efficient aeration.

A further object is to provide a novel drain valve.

Another object is to provide a novel drain valve in a tank that assures against loss of the contents of the tank.

Another object is to provide novel means for sampling the contents of a tank.

Further objects, as well as a clear understanding of the present invention, will be had by reference to the following detailed description and drawings.

Fig. 1 is a diagrammatic view in front elevation of the system illustrating the component parts of the system and the piping arrangement by which the components are integrated in the system.

Fig. 2 is a partial, sectionalized view of the aerating device shown in relation to its position with respect to the wall of the fermentor vessel and the source of air supply.

Fig. 3 is a sectional view of the sampling adapter assembly.

Fig. 4 is a partial sectional view in elevation of the novel drain valve.

Referring now to Fig. 1, the fermentation tank or fermentor 10 is an all welded vessel preferably made of stabilized stainless steel described in Stainless Steel Handbook, Allegheny Ludlum Steel Corporation, Pittsburgh, Pennsylvania, 1956. All welds in the tank are ground smooth and surfaces of the fermentor 10 which are to come into contact with the culture are polished, e.g., to a number 4 finish, ASTM standard, in order to facilitate cleaning.

Through experience, it has been learned that a prominent cause of contamination in fermentation processes has been a lack of complete sterilization of the fermentation tank. A cause of this incomplete sterilization has been the inability of a decontaminating material to decontaminate foreign matter from in and around various burrs, projections and crevices in the metal surface of the tank. Thus, a removal of these imperfections and polishing the surface of the tank eliminates one of the major problems in sterilization of fermentation tanks.

The tank 10 has disposed in its upper portion a ground faced media inlet 15 with valve 14 adapted to receive the corresponding end of a media line 12, a centrally disposed gas removal or steam purging line 16, optionally fluidly connected to steam line 19 by valve 18, but in constant fluidal communication with gas exit line 17 located as shown in Fig. 1. Also in the upper portion of the tank is situated a sampling adaptor 20 similar to the sampling adaptor 22 positioned in the lower portion of the tank, the structure of which will be set forth in detail infra.

In the lower portion of the tank, which is preferably conically shaped, there is disposed a drain valve 30 through which fluid from line 40 flows through valve 42 to line 44 and into steam seal tank 46 for a purpose hereinafter set forth. An orifice aerator 48, of novel design, is situated through said tank and is fluidly connected by means of fluid pipe 50 to gas filter 52 having therein suitable filter means such as a fine glass wool (not shown) to filter the aerating gas passing therethrough. Surrounding the filter 52 is a filter temperature controlling jacket 54. The purpose of this jacket is to maintain the gas filter at an elevated temperature at least at the dew point of the aerating gas. The filter is operated with the air passing down through the filter material in order to eliminate pockets in the air system. All water vapor passing through the filter is prevented from condensing by the controlled temperature, thereby preventing condensation of moisture which would flow by gravity through the filter and carry contaminants into the fermentor. The gas filter 52 at 56 is fluidly connected, at the option of the operator, to either aerating gas line 60 or steam line 64 by means of valves 58 and 62 respectively. Any undesirable gas in the fermentor may be removed through lines 16 and 17 by means of a vacuum created by steam jet 66 connected to steam line 64 through valve 65. The mixture of gas and steam is exhausted into steam seal tank 46. During fermentation, the action of the jet 66 maintains a negative pressure of approximately 6 inches of water in the void above the contents of the tank. This negative pressure aids in assuring that any leakage which may occur in the head of the vessel remains in the system, thus reducing the hazard to surrounding operating personnel. The steam seal tank 46 provides a means of isolating the system from other systems and from its environment. The steam seal tank is vented at 70 and has a drain valve 72 connected to steam line 40 in the manner similar to drain valve 30. Sewage line 74 acts as a drain for the steam seal tank.

Thermocouple 80, or other suitable device, is connected to the fermentation tank 10 in order to determine the temperature of the tank which is maintained and controlled by fermentor jacket 82 having suitable fluid lines 84 and 86.

The orifice aerator 48 shown in Fig. 2 is welded at an angle with the wall of tank 10 in order to assure that any and all liquid in the gas line will remain within the fermentor. The assembly of the aerator is composed of three parts, an aerator barrel 88 of sufficient length to be partially submerged in the contents of the tank, a removable orifice plate 90 disposed in the end portion thereof which has an arifice 92. The orifice plate is withdrawn or inserted through the upstream end of the aerator barrel. It should be noted, however, that the location of the orifice in relation to the barrel 88 and the number of the orifices used may vary according to the desired results, and it is within the skill of the operator to make a proper selection. The orifice diameter and the aeration gas are such that the gas is forced through the orifice 92 at critical pressure ratio such that sonic gas velocities are produced. It has been found that a gas (e.g. air) passing at sonic velocities through an orifice will produce a large number of minute bubbles in the order of $10\mu$ or less in diameter and cause agitation of a liquid being aerated thus producing a highly desirable increase in aeration efficiency with a consequent increase in growth of the microorganisms to be cultured.

Sonic velocities are obtained with air, for example, at 15° C. through an orifice where $$\frac{A_1}{A_2}$$

is greater than 25 and $$\frac{P_2}{P_1}$$

is less than .53 (critical pressure ratio of air @ 15° C., where $A_1$=area of orifice plate or barrel immediately before the orifice; $A_2$=area of sharp edged orifice; $P_2$=downstream pressure (absolute); $P_1$=upstream pressure (absolute). It has been found that an orifice of 0.0132 in diameter, an orifice plate diameter .156 in. and a pressure difference across the orifice of 13#/in.² will pass air (at 15° C.) through the orifice at sonic velocities. However, it should be recognized that various combinations of diameters and pressures may be used as long as they conform to the area and pressure ratios set forth. It has been determined that higher aeration efficiencies may be obtained by use of additional orifices and/or by introducing the gas tangentially to the tank 10. The upstream end of the orifice aerator preferably has positioned thereon a sampling adapter 24 similar to the sampling adapters 20 and 22 previously mentioned, the structure of which follows.

The sampling adapter is designed to allow easy access into the interior of the tank 10 without the danger of contamination entering through the opening. The present structure accomplishes these results and is both simple and efficient. Fig. 3 clearly shows the novel structure of a body 94 and a suitable cap 96 having a washer 95 thereon enclosing a rubber diaphragm retained by a washer 100 and a retaining ring 102. The rubber diaphragm 98 is pierceable, yet self-sealing and permits the entry and removal of instruments (e.g. hypodermic needle) to sample or inject materials in the tank. Noteworthy in this procedure is the omission of the use of any opening that would provide a source of contamination. Previously known means for sampling did not incorporate the self-sealing, easy access to the contents of a tank. It should be stated that the cap 96 is optional and the rubber diaphragm may be of natural or synthetic rubber, or similar material that is pierceable and self-sealing. All the sampling adapters used are welded to their respective locations such as is shown in Fig. 3. These welds, where they extend to the interior of the tank, are ground and polished as previously mentioned.

The drain valves 30 and 72 are similar in construction and comprise a valve sealer 104 welded into a cooperating opening in the tank 10, and also being in fluid communication with fluid lines 40 and 44. Depending integrally from the valve sealer is a screw operated diaphragm valve comprising a diaphragm 105 made of a suitable flexible material such as natural rubber, or a synthetic rubber such as neoprene. The diaphragm 105 is urged into engagement with the valve sealer at opening 106 to positively close this opening into tank 10. The means urging the diaphragm into the opening is not limited to the screw means 108, but rather any suitable means that will positively urge and maintain the diaphragm into the opening 106 could be used. When the screw 108 is operated by wheel 110 to urge the diaphragm 105 upwardly into opening 106, the contents of the tank 10 are restricted. However, it is the novel intention of this device to provide a valve sealer which is integral with the valve such that any seepage or undesirable leaking from around the diaphragm will not contaminate the environment of the tank. Previously known and used devices have attempted to assure a more secure shut off of the opening, which often times have resulted in complicated and time consuming closure devices. But regardless of how secure the closure is made, the danger exists that leaking may occur, and when pathogenic organisms are being process, there is thus created a dangerous situation. Further, when this valve is used, sterilization is facilitated since there are no pipe stubs or other contaminant collectors existing that would prevent complete sterilization.

The valve sealer 104 transmits sealing fluid (e.g., steam) around the diaphragm from line 40 through to line 44 such that any material leaking from the diaphragm 105 is collected by the sealing fluid and transported to the steam seal tank 46. Thus, there is no loss of the contents of the tank 10 to the surroundings and consequently no danger to the operating personnel. From the steam seal tank 46 there is a sewage line 74. During operation of the fermentor, fluid is passed around the closed diaphragm and deposited into the steam seal tank 46. When the contents of the tank 10 are to be disposed of, the diaphragm is opened by means of wheel 110, permitting the contents of tank 10 to flow through opening 106 and pipe 44 into the steam seal tank 46 and thence becoming sewage upon the opening of drain valve 72. Fluid pipe 40 has a by-pass line to the valve 72 which operates in the same safe manner as does valve 30.

Thus, it will be seen that at no time is there any substantial possibility of a loss of the contents of tank 10 to its environment.

The system is sterilized with steam as follows:

The media line 12 is connected to the fermentor 10 and the valve 14 as well as the drain valve 30 are opened, while the vent 70 and the steam seal tank drain valve 72 are opened. Steam is introduced into tank 10 by its passage into the following from steam line 64: the filter jacket 54, through valve 62 and pipe 56 into gas filter 52, the media line 12, through valve 18 and line 16.

When the temperature has reached a desired temperature, measured by thermocouple 80, the vent 70 is closed and the drain valve 30 is adjusted to allow condensate to drain, but to maintain pressure in the fermentor.

High pressure steam is introduced into the jacket 82 of the fermentor through line 84, and valve 65 to jet 66 is opened. The system is maintained at 250° F. for two hours.

After sterilization the system is cooled as follows:

The drain valve 72 is closed. All steam valves, except those to the air filter jacket, are closed and air is introduced into the fermentor to maintain pressure. Cool water is circulated through the fermentor jacket 82, and subsequently the temperature is regulated to the desired level by means of the circulating fluid through the jacket 82.

After cooling, the system is prepared for inoculation:

The fermentor drain valve 30 is closed and the fluid (e.g., steam) line 40 is opened at valve 42. The steam seal tank vent 70 is opened and the drain valve 72 is partially opened. Steam is introduced to the steam jet 66 and the supply of air is stopped. The desired volume of sterile medium is passed into the fermentor through the media line 12, inlet 15 and the valve 14. After passing the sterile media, the valve 14 is closed and the line 12 disconnected. The male portion of the coupling is capped and flooded with a liquid decontaminant. The medium is inoculated through the sampling adapter 20 with a hypodermic needle. A gas for aeration is introduced through orifice 92 into the culture at a controlled pressure producing sonic velocities that enhance growth of the microorganisms.

After completion of fermentation, the culture may be removed by way of the steam seal tank 46 as described above.

The system herein described has been used for studying the bio-engineering aspects of the fermentation processes of fastidious organisms. Cultures with characteristics similar to those prepared in laboratory equipment have been prepared in this system.

From the foregoing detailed description, it will be evident that there are a number of changes, adaptations and modifications of the present invention that come within the province of those skilled in the art; however, it is intended that all such variations in structure, modes of usage and materials be considered to be within the scope of the invention as limited solely by the appended claims.

We claim:

1. An apparatus for the culture of pure pathogenic and fastidious microorganisms comprising a fermentation tank with a conically shaped bottom, a gas inlet means connected to the bottom portion of said fermentation tank, a filter connected to said gas inlet means, a gas supply means connected to the other side of said filter, at least one adapter means connected with said fermentation tank for permitting the admission and withdrawal of materials from said tank, means connected with said tank for maintaining a vacuum in said tank whereby the undesirable egress of its contents is prevented, a valve and fluid sealing means integrally connected to the bottom of said tank for dumping the contents of said tank when desired and also for preventing any leakage, and steam seal tank being connected to said means for maintaining a vacuum and to said valve and fluid sealing means in order to collect their effluent.

2. The apparatus of claim 1 wherein at least one said adapter means comprises seal holder integrally attached to said fermentor tank, self sealing means contained within said seal holder in order to permit a hypodermic needle to pierce the self sealing means, enter into said tank, and be removed from said tank and self sealing means without allowing any leakage of the tank contents.

3. The apparatus of claim 2 wherein the self sealing means is a thick rubber diaphragm.

4. The apparatus of claim 1 wherein said gas inlet means comprises an orifice aerator adapted to provide gas aeration at sonic velocities and to provide agitation and sampling, which comprises a tubular member being attached to said tank, a portion of said tubular member being within said tank, a removable orifice nozzle contained within the portion of said tubular member within said tank, and an inlet line attached to the opposite end of said tubular member to allow gas to pass from said filter to said orifice.

5. The apparatus of claim 4 wherein said orifice nozzle is threadedly attached to said tubular member so that different sized nozzles may be placed therein.

6. The apparatus of claim 1 wherein the means for maintaining a vacuum comprises a steam jet, the effluent from said steam jet being sent to said steam seal tank.

7. The apparatus of claim 1 wherein the valve and fluid sealing means comprises a valve sealer connected to the bottom of said fermentator tank by means of welds, a diaphragm valve for engaging the bottom of said valve sealer, means to move said diaphragm valve on inlet steam fluid line and an exit steam fluid line, each being connected to the other above and adjacent to said diaphragm valve in order to carry away to said steam seal tank any of the deadly microorganisms which may have seeped by said diaphragm valve from said fermentator tank and valve sealer.

8. The apparatus of claim 1 wherein said filter comprises a gas filter medium heated to maintain the gas above its dew point.

References Cited in the file of this patent

UNITED STATES PATENTS

| | | |
|---|---|---|
| 1,205,619 | Hansen | Nov. 21, 1916 |
| 2,111,102 | Magne | Mar. 15, 1938 |
| 2,298,561 | Hendrickson | Oct. 13, 1942 |
| 2,545,572 | Dulaney | Mar. 20, 1951 |
| 2,686,754 | Monod | Aug. 17, 1954 |
| 2,689,818 | Fischer | Sept. 21, 1954 |
| 2,772,867 | Cleckner | Dec. 4, 1956 |

UNITED STATES PATENT OFFICE
CERTIFICATE OF CORRECTION

April 25, 1961

Patent No. 2,981,660

Glenwood B. Achorn, Jr., et al.

It is hereby certified that error appears in the above numbered patent requiring correction and that the said Letters Patent should read as corrected below.

Column 1, line 26, for "formentation" read -- fermentation --; column 3, line 27, for "arifice" read -- orifice --; column 4, line 42, for "process" read -- processed --.

Signed and sealed this 19th day of September 1961.

(SEAL)
Attest:

ERNEST W. SWIDER
Attesting Officer

DAVID L. LADD
Commissioner of Patents